United States Patent [19]

Green

[11] Patent Number: 5,693,724
[45] Date of Patent: Dec. 2, 1997

[54] LOW VOC CURABLE COATING COMPOSITION UTILIZING CARBAMATE-FUNCTIONAL COMPOUND

[75] Inventor: Marvin L. Green, Brighton, Mich.

[73] Assignee: BASF Corporation, Southfield, Mich.

[21] Appl. No.: 673,937

[22] Filed: Jul. 1, 1996

[51] Int. Cl.$^6$ .............................. C08G 8/28; C08G 59/14; C08L 63/00; C08L 67/04
[52] U.S. Cl. ........................ 525/481; 525/488; 525/510; 525/514; 525/528
[58] Field of Search .................................. 525/510, 514, 525/481, 488, 528

[56] References Cited

U.S. PATENT DOCUMENTS 5,356,669  10/1994  Rehfuss ............................. 427/407.1

Primary Examiner—Donald R. Wilson
Attorney, Agent, or Firm—Paul L. Marshall; Anne M. Budde

[57] ABSTRACT

There is described a curable coating composition comprising:
(A) a carbamate-functional component that is the reaction product of:

(1) a compound having a plurality of hydroxyl groups that is the reaction product of:
  (a) a compound comprising at least one epoxide group and
  (b) a compound comprising a plurality of organic acid groups, (2) a compound comprising a carbamate group, and
(B) a component comprising a plurality of groups that are reactive with the carbamate functional groups on component (A).

20 Claims, No Drawings

LOW VOC CURABLE COATING COMPOSITION UTILIZING CARBAMATE-FUNCTIONAL COMPOUND

FIELD OF THE INVENTION

This invention relates to curable coating compositions, particularly to curable compositions utilizing a carbamate-functional compound as one of the components of the composition.

BACKGROUND OF THE INVENTION

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

Such coatings are especially susceptible to a phenomenon known as environmental etch. Environmental etch manifests itself as spots or marks on or in the finish of the coating that often cannot be easily rubbed out.

It is also often desirable to provide options of different types of carbamate-functional materials to provide coatings with a good combination of properties such as durability, hardness, flexibility, and resistance to scratching, marring, solvents, and acids.

Curable coating compositions based on curable components having carbamate functionality have been described in the art to provide etch-resistant coatings, e.g., U.S. Pat. No. 5,356,669 and WO 94/10211. Non-polymeric carbamate-functional compounds for coating compositions have been described in U.S. Pat. No. 5,336,566 and EP 636,660.

In order to obtain the smooth finishes that are often highly desirable in the coatings industry, coating compositions preferably tend to be fluid in nature, and to exhibit good flow. Good flow is observed when the coating composition is fluid enough at some point after it is applied to the substrate and before it cures to a hard film so that the surface of the coating takes on a smooth appearance. Some coating compositions exhibit good flow immediately upon application and others exhibit good flow when heated. One way to impart fluid characteristics and good flow to a coating composition is to incorporate volatile organic solvents into the compositions. These solvents can provide the desired fluidity and flow during the coating process, after which they evaporate, leaving only the coating components behind. However, the use of such solvents also increases the volatile organic content (VOC) of the coating composition. Because of the adverse impact VOC has on the environment, many government regulations impose limitations on the amount of solvent that can be used. It would thus be desirable to utilize coating composition components that provide good fluidity and flow to the coating composition without the need for large amounts of solvent.

Because of their other beneficial properties, it would also be desirable to provide carbamate-functional compounds for use in coating compositions that do not require large quantities of solvent.

SUMMARY OF THE INVENTION

According to the present invention, there is provided a curable coating composition comprising:
(A) a carbamate-functional component that is the reaction product of:
  (1) a compound having a plurality of hydroxyl groups that is the reaction product of:
    (a) a compound comprising at least one epoxide group and
    (b) a compound comprising a plurality of organic acid groups,
  (2) a compound comprising a carbamate group, and
(B) a component comprising a plurality of groups that are reactive with the carbamate functional groups on component (A).

Compositions of the present invention can reduce the need for organic solvents, and can also impart to coating compositions the ability to spray apply at high viscosities while still maintaining good flow and appearance characteristics.

The present invention provides coatings having a good combination of properties such as durability, hardness, and resistance to scratching, marring, solvents, and acids. Coating compositions according to the invention can also provide low VOC levels while maintaining other beneficial properties that are often found in coating compositions containing relatively high amounts of solvent, such as good sag resistance, leveling, low orange peel, gloss, DOI, wetting of the substrate, and pigment dispersing and loading, and uniform cure.

DESCRIPTION OF THE PREFERRED EMBODIMENTS

According to the invention, compound (A)(1) comprises a plurality of hydroxyl groups and is the reaction product of (a) a compound comprising at least one epoxide group and (b) a compound comprising a plurality of organic acid groups. The reaction between the epoxide compounds (a) and (b) is believed to be a ring-opening reaction between the epoxy group and the organic acid group. This reaction often utilizes carboxylic acid groups, although other organic acids such as phenolic compounds may be used as well. The acid/epoxy reaction is well-known in the chemical arts, and may proceed spontaneously at ambient conditions, either in solvent or neat, and may be advantageously accelerated with heat.

Compound (A)(1) may be a monoepoxide or a polyepoxide. Virtually any epoxide may be used in the practice of the present invention. Epoxides are well-known in the art, and may be characterized by the general formula:

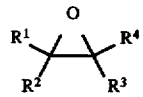

where $R^1$, $R^2$, $R^3$ and $R^4$ are each independently H (with the proviso that at least one of $R^1$–$R^4$ is other than H), an organic radical, which may be polymeric or non-polymeric and may contain unsaturation and/or heteroatoms, or one of $R^1$ or $R^2$ together with one of $R^3$ or $R^4$ may form a cyclic ring, which may contain unsaturation and/or heteroatoms.

Useful epoxides can be prepared from alcohols, e.g., butanol, trimethylol propane, by reaction with an epihalohydrin (e.g., epichlorohydrin), or by reaction of an allyl group with peroxide. The epoxide may be monofunctional or polyfunctional, which can be controlled by selection of the starting material. For example, a monoepoxide can be prepared by reacting a mono-alcohol or mono-acid with an epihalohydrin or a monounsaturate with peroxide, and a polyepoxide can be prepared by reacting a polyol (including diols, triols, and higher-functionality polyols) with an epihalohydrin or a polyunsaturate compound with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate (including isocyanurates, e.g., the isocyanurate of isophorone diisocyanate) or polymer or oligomer with glycidol. Other known polyepoxides, e.g., epoxy-novolacs, may also be used.

In one preferred embodiment, the epoxide is a monoepoxide, preferably an epoxy ester, also known as a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

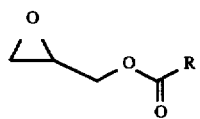

wherein R is a hydrocarbon group of from 1 to 40 carbon atoms, preferably 1–20 carbon atoms, and most preferably 1–12 carbon atoms. This hydrocarbon group may be substituted, as is known in the art. Polyglycidyl esters may also be used, and can be prepared by reacting a polyfunctional carboxylic acid (e.g., phthalic acid, thioglycolic acid, adipic acid) with an epihalohydrin. Polyglycidyl esters can also be described by the above formula where R is substituted with other glycidyl ester groups.

Another useful class of monoepoxides are glycidyl ethers. Glycidyl ethers can be prepared by the reaction of monofunctional alcohols (e.g., n-butanol, propanol, 2-ethyl hexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like. These compounds are commercially available under the Erisys® product family from CVC Specialties. Polyglycidyl ethers may also be used, and can be prepared by reacting a polyfunctional alcohol (e.g., bisphenol A, 1,6-hexane diol) with an epihalohydrin.

Epoxides may also be prepared by reacting a compound containing one or more double bonds with peroxide or peracetic acid under conditions well-known in the art. Virtually any double bond-containing compound may be used. One useful class of double bond-containing compounds are cycloaliphatic monounsaturated compounds such as

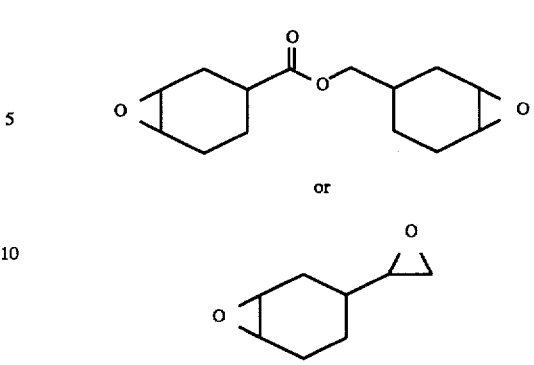

or which may be sold as the Cyracure® products from Union Carbide. Other double bond-containing compounds that may be used in the practice of the invention include ethylene, propylene, styrene, styrene oxide, cyclohexene, polybutadiene, and the like.

The epoxide may also be an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate.

The above-described epoxides are reacted with a compound (b) comprising a plurality of organic acid groups. The use of a polyacid provides a plurality of hydroxyl groups available for transesterification with the carbamate compound (A)(2) even if a monoepoxide is used. Useful polyacids include tricarballylic acid, adipic acid, azeleic acid, trimellitic anhydride, citric acid, malic acid, tartaric acid, bisphenol F, and bisphenol A. If the polyacid is reacted with a polyepoxide, the starting materials and reaction conditions should be controlled so as to avoid any unwanted chain extension or branching, which could result in high molecular weight compounds that could increase VOC or cause gelation. If hydroxyl groups are present on the the polyacid (e.g., citric acid), the reaction is preferably conducted without catalyst so that unwanted reaction of the hydroxyl groups with the epoxy groups is minimized.

The compound (A)(1) is reacted with a compound (A)(2) to form the carbamate-functional compound (A). In one embodiment, (A)(2) is cyanic acid, which may be formed by the well-known reaction of the thermal decomposition of urea or by other methods, such as described in U.S. Pat. Nos. 4,389,386 or 4,364,913. In another embodiment, (A)(2) is a compound comprising a carbamate group. In this embodiment, the reaction between (A)(1) and (A)(2) is believed to be a transesterification between the OH groups on (A)(1) and the carbamate ester on compound (A)(2). The carbamate compound (A)(2) can be any compound having a carbamate group capable of undergoing a transesterification with the hydroxyl groups on component (A)(1). These include, for example, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

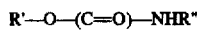

wherein R' is substituted or unsubstituted alkyl (preferably of 1–8 carbon atoms) and R" is H, substituted or unsubstituted alkyl (preferably of 1–8 carbon atoms, substituted or unsubstituted cycloalkyl (preferably of 6–10 carbon atoms), or substituted or unsubstituted aryl (preferably of 6–10 carbon atoms). Preferably, R" is H.

The transesterification reaction between compounds (A)(1) and (A)(2) can be conducted under typical transesterification conditions, e.g., temperatures from room temperature to 150° C. with transesterification catalysts such as calcium octoate, metal hydroxides (e.g., KOH), Group I or II metals (e.g., Na, Li), metal carbonates (e.g., $K_2CO_3$) which may be enhanced by use in combination with crown ethers, metal oxides (e.g., dibutyltin oxide), metal alkoxides (e.g., $NaOCH_3$, $Al(OC_3H_7)_3$), metal esters (e.g., stannous octoate, calcium octoate, or protic acids (e.g., $H_2SO_4$), $MgCO_3$, or $Ph_4SbI$. The reaction may also be conducted at room temperature with a polymer-supported catalyst such as Amberlyst-15® (Rohm & Haas) as described by R. Anand, *Synthetic Communications*, 24(19), 2743–47 (1994), the disclosure of which is incorporated herein by reference.

The ring-opening of the oxirane ring of an epoxide compound by a carboxylic acid results in a hydroxy ester structure. Subsequent transesterification of the hydroxyl group on this structure by the carbamate compound (A)(2) results in a carbamate-functional component that can be represented by either of the structures:

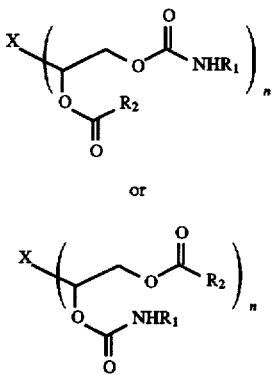

or a combination thereof, wherein n is a positive integer of at least 1, $R_1$ represents H, alkyl, or cycloalkyl, and $R_2$ represents alkyl, aryl, or cycloalkyl, and X represents an organic radical that is a residue of the epoxide compound. As used herein, it should be understood that these alkyl, aryl, or cycloalkyl groups may be substituted. For example, where a monoepoxide is reacted with a polyacid, $R_2$ in the above structures would represent the residue of the polyacid, and would be substituted with other carbamate group(s) resulting from the other acid groups on the polyacid reacting with the monoepoxide followed by transesterification with the carbamate compound (A)(2).

The composition of the invention is cured by a reaction of the carbamate-functional compound (A) with a component (B) that is a compound having a plurality of functional groups that are reactive with the carbamate groups on component (A). Such reactive groups include active methylol or methylalkoxy groups on aminoplast crosslinking agents or on other compounds such as phenol/formaldehyde adducts, siloxane or silane groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), N-methylol acrylamide emulsions, isobutoxy methyl acrylamide emulsions, polyanhydrides (e.g., polysuccinic anhydride), and siloxanes or silanes (e.g., dimethyldimethoxy silane). Aminoplast resin such as melamine formaldehyde resin or urea formaldehyde resin are especially preferred. Also useful are aminoplast resins where one or more of the amino nitrogens is substituted with a carbamate group for use in a process with a curing temperature below 150° C., as described in U.S. Pat. No. 5,300,328.

A solvent may optionally be utilized in the coating composition used in the practice of the present invention. The coating composition according to the present invention can be applied without solvent, especially if the degree of chain extension for component (A) is limited. However, in many cases, it is desirable to use a solvent in the coating composition as well. This solvent should act as a solvent with respect to both the carbamate-functional compound (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. another embodiment, the solvent can be water or a mixture of water with co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Although a solvent may be present in the coating composition in an amount of from about 0.01 weight percent to about 99 weight percent, it is preferably present in an amount of less than 30%, more preferably less than 20% and most preferably less than 10%. The coating composition preferably has a VOC (VOC is defined herein as VOC according to ASTM D3960) of less than 3.8 lbs/gal, more preferably less than 3.0 lbs/gal, even more preferably less than 2.0 lbs/gal, and most preferably less than 1.0 lbs/gal.

Coating compositions can be coated on the article by any of a number of techniques well-known in the art. These include, for example, spray coating, dip coating, roll coating, curtain coating, and the like. For automotive body panels, spray coating is preferred. One advantage that can be achieved with coating compositions according to the invention is that coatings with a high degree of flexibility can be prepared. Accordingly, in a preferred embodiment, the substrate onto which the coating is applied is flexible, such as plastic, leather, or textile substrates.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

In one preferred embodiment, the coating composition according to the invention is preferably utilized in a high-gloss coating and/or as the clearcoat of a composite colorplus-clear coating. High-gloss coatings as used herein are coatings having a 20° gloss (ASTM D523-89) or a DOI (ASTM E430-91) of at least 80. In other preferred embodiments, the coating composition may be utilized to prepare high-gloss or low-gloss primer or enamel coatings.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally names as pigments. Pigments are usually used in the composition in an amount of 2% to 350%, based on the total weight (not including solvent) of components A and B (i.e., a P:B ratio of 0.02 to 3.5).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C. The coating composition according to the present invention is curable even at relatively low cure temperatures. Thus, in a preferred embodiment, the cure temperature is preferably between 115° C. and 150° C., and more preferably at temperatures between 115° C. and 138° C. for a blocked acid catalyzed system. For an unblocked acid catalyzed system, the cure temperature is preferably between 82° C. and 99° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

In a number of embodiments of the present invention, the curable coating composition, when cured, can result in coatings having a surprising combination of high cross-link density without becoming brittle. As used herein, crosslink density is determined as described in the "Paint and Coatings Testing Manual", Gardner-Sward Handbook, 14th ed., chapt. 46, p. 534, ASTM, 1995. Crosslink density is expressed in moles/cm$^3$ and is calculated using the formula $$v_e = \frac{G'}{RT} = \frac{E'}{3RT}$$

where $v_e$=moles of elastically effective network chains per cubic centimeter of film, the storage modulus values, G' or E', are obtained in the rubbery plateau, T is temperature in degrees K corresponding to the storage modulus value, and R is the gas constant ($8.314 \times 10^7$ dynes/deg. K-mole). Thus, one embodiment of the invention is directed toward a cured coating derived from the above-described curable coating compositions, which has a cross-link density of at least 3, and preferably at least 10.

The invention is further described in the following examples.

Preparation 1

In the first step, 120 parts of dimethylolpropionic acid (DMPA), a 25% aliquot of the stoichiometric ratio, was charged with 943 parts of Glydexx® N-10 glycidyl neodecanoate to a reaction vessel. The mixture was heated to a temperature of 128° C. After a slight exotherm, three more 25% increments of 120 parts of the DMPA were added spaced over a 4-hour period and the temperature was maintained at 130° C. The reaction was monitored via acid number to a value of <3 and contained no residual epoxy groups.

In step two, 1211 parts of methyl carbamate, a 50% excess, was added along with 10 parts of dibutyltin oxide catalyst and 950 parts of toluene. A reflux temperature of 109°–117° C. was maintained for 32 hours as methanol was trapped off. The progress of the reaction was monitored by hydroxyl number to at least 95% completion. The excess methyl carbamate and solvent were stripped off and 450 parts of amyl acetate was added to reduce to a non-volatile content of 80%.

Preparation 2

In the first step, 89 parts of citric acid, a 25% aliquot of the stoichiometric ratio, was charged with 1470 parts of Glydexx® N-10 glycidyl neodecanoate to a reaction vessel. The mixture was heated to a temperature of 128° C. After a slight exotherm, three more 25% increments of 89 parts of the citric acid were added spaced over a 4-hour period and the temperature was maintained at 130° C. The reaction was monitored via acid number to a value of <3 and contained no residual epoxy groups.

In step two, 840 parts of methyl carbamate, a 50% excess, was added along with 12.8 parts of dibutyltin oxide catalyst and 1200 parts of toluene. A reflux temperature of 109°–117° C. was maintained for 32 hours as methanol was trapped off. The progress of the reaction was monitored by hydroxyl number to at least 95% completion. The excess methyl carbamate and solvent were stripped off and 425 parts of amyl acetate was added to reduce to a non-volatile content of 80%.

EXAMPLE 1

A coating composition was prepared by mixing 84 parts of the product of Preparation 1 with 27 parts of a commercial liquid hexamethoxymethyl melamine resin. Also, 4 parts of blocked dodecylbenzene sulfonic acid catalyst along with 22 parts of amyl acetate were added to give a coating composition with 61% weight non-volatile content. The coating composition was sprayed onto a panel over a conventional high-solids basecoat containing a hydroxy-functional acrylic polymer and a melamine resin curing agent, and cured for 20 minutes at 132° C. metal temperature. The resulting coating exhibited good film properties as measured by humidity resistance, solvent resistance, hardness, etch resistance, gravelometer, and weathering resistance.

EXAMPLE 2

A coating composition was prepared by mixing 97 parts of the product of Preparation 2 with 19 parts of a commercial liquid hexamethoxymethyl melamine resin. Also, 4 parts of blocked dodecylbenzene sulfonic acid catalyst along with 20 parts of amyl acetate were added to give a coating composition with 64% weight non-volatile content. The coating composition was sprayed onto a panel over a conventional high-solids basecoat containing a hydroxy-functional acrylic polymer and a melamine resin curing agent, and cured for 20 minutes at 132° C. metal temperature. The resulting coating exhibited good film properties as measured by humidity resistance, solvent resistance, hardness, etch resistance, gravelometer, and weathering resistance.

The invention has been described in detail with reference to preferred embodiments thereof. It should be understood, however, that variations and modifications can be made within the spirit and scope of the invention.

What is claimed is:

1. A curable coating composition comprising:
   (A) a carbamate-functional component that is the reaction product of:
      (1) a compound having a plurality of hydroxyl groups that is the ungelled reaction product of:
         (a) a compound comprising at least one epoxide group and
         (b) a compound comprising a plurality of organic acid groups selected from the group consisting of carboxylic acid groups, phenolic groups, and mixtures thereof;
      (2) a compound comprising a carbamate group, and
   (B) a component comprising a plurality of groups that are reactive with the carbamate functional groups on component (A).

2. A curable coating composition according to claim 1 wherein said compound (A)(1)(a) is a glycidyl ether.

3. A curable coating composition according to claim 1 wherein said compound (A)(1)(a) is a glycidyl ester.

4. A curable coating composition according to claim 3 wherein said glycidyl ester has the formula:

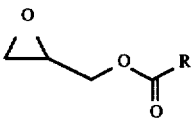

wherein R is a hydrocarbon group of from 1 to 40 carbon atoms.

5. A curable coating composition according to claim 4 wherein R is a hydrocarbon group of from 1 to 12 carbon atoms.

6. A curable coating composition according to claim 1 wherein said compound (A)(1)(a) comprises a plurality of epoxide groups.

7. A curable coating composition according to claim 1 wherein said compound (A)(1)(a) comprises a single epoxide group.

8. A curable coating composition according to claim 1 wherein said compound (A)(1)(a) is the glycidyl ester of neodecanoic acid.

9. A curable coating composition according to claim 1 wherein said organic acid groups are carboxylic acid groups.

10. A curable coating composition according to claim 1 wherein component (B) is an aminoplast resin.

11. A Curable coating composition according to claim 11 wherein said aminoplast resin is a melamine resin.

12. A curable coating composition according to claim 1 having a VOC of less than 3.8 lbs/gal.

13. A curable coating composition according to claim 12 having a VOC of less than 3.0 lbs/gal.

14. A curable coating composition according to claim 13 having a VOC of less than 2.0 lbs/gal.

15. A curable coating composition according to claim 14 having a VOC of less than 1.0 lbs/gal.

16. A cured coating comprising the reaction product of a coating composition according to claim 1.

17. A cured coating according to claim 16 having a crosslink density of at least 3.

18. A cured coating according to claim 17 having a crosslink density of at least 10.

19. A coating according to claim 18 having a 20° gloss, as defined by ASTM D523-89, of at least 80.

20. A coating according to claim 16 having a DOI, as defined by ASTM E430-91, of at least 80.

* * * * *